United States Patent [19]

Bertocchio et al.

[11] Patent Number: 4,647,391
[45] Date of Patent: Mar. 3, 1987

[54] CHLOROFLUORINATED FLUIDS FOR ABSORPTION MACHINES

[75] Inventors: Rene Bertocchio, Vernaison; Andre Gagnieur, Rochetaillée sur Saône; Henri Mathias, Saint Didier au Mont d'Or, all of France

[73] Assignee: Atochem, France

[21] Appl. No.: 812,182

[22] Filed: Dec. 23, 1985

[30] Foreign Application Priority Data

Dec. 26, 1984 [FR] France ................................ 84 19832
Dec. 26, 1984 [FR] France ................................ 84 19833

[51] Int. Cl.$^4$ ............................................. C09K 5/04
[52] U.S. Cl. ......................................... 252/69; 62/102; 62/109; 62/112; 252/67; 570/134
[58] Field of Search .................... 252/69; 62/102, 109, 62/112; 570/134

[56] References Cited

U.S. PATENT DOCUMENTS 4,428,854 1/1984 Enjo et al. ........................... 252/69

Primary Examiner—Robert A. Wax
Attorney, Agent, or Firm—Brooks, Haidt, Haffner & Delahunty

[57] ABSTRACT

Working fluid/solvent compositions for use in absorption heating and cooling equipment, which compositions comprise a chlorofluoroethane with a boiling point between −40° and +50° C. and at least one solvent with a boiling point above 100° C., the solvent being at least one material having the formula:

$$C_mCl_{2m+1}-(CF_2-CFCl)_n-X$$

wherein m is zero or one, n is an integer from one to four, and is at least two when m is zero, and X is hydrogen or chlorine, X being hydrogen only when m is one.

5 Claims, No Drawings

CHLOROFLUORINATED FLUIDS FOR ABSORPTION MACHINES

BACKGROUND OF THE INVENTION

This invention relates to novel compositions containing heat transfer fluids and solvents, and more particularly, it relates to novel chlorofluorocarbon compositions useful in absorption heating and cooling apparatus.

Machines operating on the principle involving extraction, through absorption, of low-level heat energy derived, for instance, from outside air for a heat pump or from a chilled space for a cold-producing unit, and on the return of this energy to the premises to be heated in the first case, or to the surrounding space in the second case, make use of a readily vaporizable material (the heat transfer working fluid) and a low-volatility material which is preferably a good solvent for the former. In a heat pump, the solution enriched in heat transfer fluid after absorption returns to the boiler where the two fluids are once again separated by heating. The heat transfer fluid is vaporized and conveyed to the pump circuit where it first undergoes condensation at an elevated temperature and then pressure reduction and subsequent evaporation before returning to the absorber.

The selected heat transfer working fluid/solvent pairs must meet a number of criteria related to the practical operation of such machines:

(a) The boiling points under normal pressure must be separated by at least 150° to 200° C. to avoid the use of a reflux device for the solvent;

(b) The boiling point of the heat transfer fluid must be neither too low, to avoid the use of high service pressures, nor too high, to satisfy (a);

(c) The proportions of the two materials employed must be completely miscible over a wide temperature range;

(d) The solvent must remain liquid at low temperature and have a solidification point which is as low as possible to maintain an acceptable viscosity at temperatures of the order of $-20°$ to $0°$ C.;

(e) The mixture must have excellent thermal and chemical stability in the temperature range involved in the thermodynamic cycle, that is, at a temperature region ranging, in the case of heat pumps in particular, from $-10°$ C. for the cold source (absorber) to $150°-180°$ C. for the boiler; and (f) Finally, the products chosen must not be toxic in any way.

For safety reasons and also on account of their good thermal and chemical stability, the majority of heat transfer fluids are selected from fluorinated hydrocarbons and, especially, from chlorofluorinated hydrocarbons containing one or two carbon atoms. These best meet the volatility and solubility criteria set forth above. The most widely employed compounds are dichlorodifluoromethane (R-12), dichlorofluoromethane (R-21), chlorodifluoromethane (R-22), chlorofluoromethane (R-31), 1,2-dichloro-1,1,2,2-tetrafluoroethane (R-114), 1,1-dichloro-1,2,2,2-tetrafluoroethane (R-114a), chloropentafluoroethane (R-115), 1,1-dichloro-2,2,2-trifluoroethane (R-123), 1,2-dichloro-1,2,2-trifluoroethane (R-123a), 1,1-dichloro-1,2,2-trifluoroethane (R-123b), 1-chloro-1,2,2,2-tetrafluoroethane (R-124), 1-chloro-1,1,2,2-tetrafluoroethane (R-124a), 1-chloro-1,2,2-trifluoroethane (R-133), 1-chloro-2,2,2-trifluoroethane (R-133a), 1-chloro-1,1,2-trifluoroethane (R-133b), and 1-chloro-1,1-difluoroethane (R-142b).

When the fluorinated hydrocarbon contains one or more hydrogen atoms, the best solvents are those capable of forming intermolecular combinations via a hydrogen bond and are selected from the categories of carbonyl derivatives such as esters, ketones, amides, and lactams; alcohols; or polyethylene glycol ethers. Among the most widely used solvents, the dimethyl ethers of tri or tetraethylene glycol are shown in USSR Patent No. 150,113, Japanese Application No. 79-152,257, and German Application No. 3,202,377; N-methylpyrrolidone is shown in USSR Patent No. 643,524 and Japanese Applications Nos. 79-145,774 and 82-132,545; N,N-dimethylformamide is shown in Japanese Application No. 82-121,759; and dibutyl phthalate is shown in USSR Patent No. 346,326. Imidazolines and phosphoramides in Japanese Application No. 82-132,544 and German Application No. 2,944,189, and tetrahydrofurfuryl alcohol derivatives in U.S. Pat. No. 4,251,382 have also been recommended as solvents.

In absorption machine boilers, solutions enriched in the working fluid are heated to elevated temperatures. The walls of the boiler are generally metallic materials based on iron, aluminum or copper which, under the effect of the temperature, may constitute a destabilizing element for the heat transfer fluid/ solvent pair. It is well known, in fact, that a chlorofluorinated hydrocarbon of the type $C_nH_{2n+2}-x-yF_xCl_y$, heated in the presence of one of the aforementioned metals and a hydrogen-donor compound, undergoes a quantitative conversion with progressive substitution of the chlorine atoms by hydrogen atoms from the solvent. A greater or lesser proportion of ethylene derivatives is also formed when n is two or greater, depending on the reactivity of the donor and the structure of the fluorinated hydrocarbon. Thus, in the case of 1-chloro-2,2,2-trifluoroethane (R-133a), these conversions take place according to the following reaction scheme:

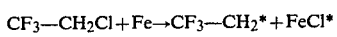

$$CF_3-CH_2Cl+Fe\rightarrow CF_3-CH_2^*+FeCl^*$$

$$CF_3-CH_2^*+R-H \text{ (solvent) }\rightarrow CF_3-CH_3+R^*$$

$$CF_3-CH_2^*+FeCl^*\rightarrow CF_2=CH_2+FeClF$$

In the case of 1-chloro-1,2,2,2-tetrafluoroethane (R-124), heated in the presence of N-methylpyrrolidone and iron, this produces 1,1,1,2-tetrafluoroethane (R-134a) and a mixture of 1,1-difluoroethylene and trifluoroethylene.

This reaction is accompanied by the formation of tars at the expense of the solvent and by considerable corrosion due to the action of the resulting metal halides. The alteration in the nature of the heat transfer fluid/solvent pair, the corrosive effects, and particularly the formation of non-condensable gases produce deterioration in the heat pump operating parameters and can very rapidly cause it to break down.

Various suggestions have been made with a view to overcoming this disadvantage and ensuring a minimum reliability of the order of 10,000 hours. The simplest of these involves stabilizing the mixture of chlorofluorinated heat transfer fluid and solvent by introducing an additive in a proportion which does not significantly modify the physico-chemical and thermodynamic properties of the heat transfer fluid/solvent pair. Unfortunately, these additives are of only limited effectiveness with time, and their action can be summarized chiefly as an extension of the inhibition period.

Another procedure involves replacing the chlorofluorinated hydrocarbon by a polyfluorinated alcohol such as trifluoroethanol, as shown in Japanese Applications Nos. 80-16315, 81-88485, 82-132545, and 83-98137. However, the relatively high boiling points of these alcohols (73.5° C. in the case of trifluoroethanol) cause a part of the apparatus (the evaporator) to operate at a pressure which is significantly below normal pressure.

Finally, the nature of the solvent can be modified and it can be chosen from a group of products which do not give rise to the foregoing reactions which take place in the presence of metals and chlorofluorinated hydrocarbons. From this point of view, structural identity has been exploited in French Patent No. 2,075,236 and U.S. Pat. No. 4,003,215, which employ pairs of chlorofluorinated hydrocarbons as solvent and working fluid. However, in the case of the pairs R-12/R-11 and R-12/R-113, mentioned in the Examples, the small boiling point differences (of the order of 40 to 80° C.) make it necessary to use complicated techniques to carry out the solvent/heat transfer fluid separation at the boiler exit.

THE INVENTION

This invention is accordingly directed to overcoming the disadvantages of the prior technology and offering chlorofluorinated solvent/chlorofluorinated heat transfer fluid pairs which are stable at elevated temperature in the presence of metals and which can be used, in particular, in absorption-type heating and cooling systems. It has now been found that trifluorochloroethylene derivatives having a boiling point greater than 100° C. and corresponding to the general formula:

$$C_mCl_{2m+1}-(CF_2-CFCl)_n-X \quad (I)$$

in which m is zero or one, n is an integer from one to four and is at least two when m is zero, preferably equal to two or three, and X is hydrogen or chlorine and not being hydrogen unless m is one, form with the chlorofluoroethanes used as the working fluid mixtures which are stable at elevated temperature in the presence of metallic, especially ferrous, materials and can consequently be used, without the addition of a stabilizer, in absorption heating or cooling units without risk of decomposition. Their chemical inertness permits ordinary materials to be used for the construction of the hot parts of the apparatus, the safety of which is further enhanced by the absolutely nonflammable nature of such mixtures.

The invention thus relates to compositions comprising, first, a chlorofluoroethane with a boiling point of between −40° and +50° C., preferably between −20° and +20° C., and second, at least one compound of formula (I) with a boiling point higher than 100° C.

The compounds of formula (I) wherein m is zero, that is, those according to the formula:

$$Cl-(CF_2-CFCl)_n-Cl \quad (Ia)$$

are low molecular weight chlorofluorinated oils obtained by thermal cracking of trifluorochloroethylene polymers. They are generally cuts, the average molecular weight of which is of the order of 500. The boiling points of these products are between 140° and 240° C. under normal pressure, and they accordingly provide a sufficient difference in volatility relative to the chlorofluoroethane hydrocarbons employed as heat transfer working fluids. Furthermore, their very low freezing points permit their use in liquid form over a very wide temperature range. A typical example of a chlorofluorinated oil according to the invention is that marketed by Atochem under the name Voltalef Oil 1 S. The freezing point of this material is below −55° C. and its boiling point is 141° C./760 torr.

The compounds of formula (I) wherein m is equal to one, that is, those according to the formula:

$$CCl_3-(CF_2-CFCl)_n-X \quad (Ib)$$

are prepared according to known processes by telomerization of trifluorochloroethylene with chloroform or carbon tetrachloride as the telogen, as shown in Boutevin et al., Tetrahedron Letters 12, 887–890 (1973) and Eur. Polym. J. 12, 219 (1976). The viscosity and volatility of the compounds of formula (Ib) depend on the nature of the telogen and the degree of telomerization. By combining both parameters, chlorofluorinated solvents are obtained, with boiling points higher than 100° C. and maintaining their liquid state over a wide temperature range. As an example, the telomers of chlorotrifluoroethylene with chloroform have the following boiling points, calculated by the B.P.N. (boiling point number) method, according to J. Chem. Eng. Data, p. 214 (1967):

| Telomer | B.P./760 torr |
|---|---|
| CCl$_3$—CF$_2$—CFClH | 142° C. |
| CCl$_3$—(CF$_2$—CFCl)$_2$H | 203° C. |
| CCl$_3$—(CF$_2$—CFCl)$_3$H | 256° C. |

Among the chlorofluoroethanes according to the present invention, it is preferred to use 1-chloro-1,2,2,2-tetrafluoroethane (R-124), 1-chloro-2,2,2-trifluoroethane (R-133a), and 1,2-dichloro-1,1,2,2-tetrafluoroethane (R-114).

The compositions according to the invention offer a wide range of complete miscibility. The relative proportions of chlorofluoroethane and of the Formula (I) compound are not critical and are restricted only by the mutual solubilities.

The following tests A to C, carried out with chlorofluorinated hydrocarbon/N-methylpyrrolidone (NMP) pairs, are given as a benchmark and should be compared with Examples I to X which illustrate the invention.

TEST A

Five millimoles of R-124 is introduced into a thick-walled Pyrex tube containing 3 g of NMP and a suitably cleaned 250 mg ordinary steel metal specimen. The tube is cooled to liquid nitrogen temperature, sealed under vacuum, and maintained for 100 hours at a temperature of 180° C. It is then again immersed in liquid nitrogen, connected to a vacuum manifold and opened with the aid of a suitable apparatus. The volatile products are recovered by low-temperature purging and analyzed by gas phase chromatography. Analysis shows that 55.4% of the original R-124 has reacted, including approximately 50% to CF$_3$—CH$_2$F (R-134a).

When the plain steel specimen is replaced by a 620 mg aluminum specimen and heating is carried out 1000 hours at 180° C., the degree of decomposition of R-124 reaches 97.4%.

TEST B

Five millimoles of R-133a, 3 g of NMP and a 250 mg specimen of plain steel are placed in a Pyrex tube and the mixture is maintained for 100 hours at 180° C. After the tube is opened, it is found that 76.1% of the original R-133a has reacted, including approximately 62.5% to $CF_3CH_3$ and 8.5% to $CF_2=CH_2$.

TEST C

A mixture of 5 millimoles of R-124, 3 g of NMP, 45 mg of tributyl phosphate, and a 250 mg specimen of plain steel are placed in a thick-walled Pyrex tube and the whole is maintained for 100 hours at 180° C. After opening the tube, it is found that 28.9% of the original R-124 has reacted, including 25% to R-134a.

All parts, percentages, proportions, and ratios herein are by weight unless otherwise stated.

The following Examples are given to illustrate embodiments of the invention as it is presently preferred to practice it. It will be understood that these Examples are illustrative, and the invention is not to be considered as restricted thereto except as indicated in the appended Claims.

EXAMPLE I

Five millimoles of R-124, 3 g of 1,1,1,3,3-pentachloro-2,2,3-trifluoropropane, and a 250 mg specimen of plain steel are placed in a Pyrex tube and the mixture is heated for 100 hours at 180° C. After opening the tube, it is found that only 1.3% of the original R-124 has reacted.

EXAMPLES II–VII

The following table summarizes the results obtained by repeating Example I with other compositions according to the invention. The solubility of the chlorofluoroethane in the solvent of Formula (I) is indicated in the last column, this solubility being measured at ordinary temperature and pressure and expressed in grams of chlorofluoroethane dissolved per 100 g of mixture. The abbreviations S-416a and S-426 have the following meaning:

S-416a : 1,1,1,3,5,5-Hexachloro-2,2,3,4,4,5-hexafluoropentane, $CCl_3-CF_2-CFCl-CF_2-CFCl_2$ S-426 : 1,1,1,3,5-Pentachloro-2,2,3,4,4,5-hexafluoropentane, $CCl_3-CF_2-CFCl-CF_2-CFClH$ 1,1,1,3,3-Pentachloro-2,2,3-trifluoropropane employed in Example I and the solvent S-416a employed in Examples II, IV, and VI are described in Eur. Polym. J. 12, 219 (1976). Their respective boiling points are 156° C. and 217° C. under normal pressure.

TABLE

| Example | Chlorofluoroethane | Solvent (I) | Amount of decomposition of the chlorofluoroethane | Solubility |
|---------|-------------------|-------------|---------------------------------------------------|------------|
| II | R-124 | S-416a | 0.5% | 12.8% |
| III | R-124 | S-426 | 0.2% | 12.0% |
| IV | R-133a | S-416a | 1.7% | 24.6% |
| V | R-133a | S-426 | 0.8% | 26.3% |
| VI | R-114 | S-416a | 0.3% | 30.5% |
| VII | R-114 | S-426 | 0.2% | 28.2% |

EXAMPLE VIII

Five millimoles of R-124, 3 g of Voltalef Oil 1 S, and a 250 mg specimen of plain steel are placed in a Pyrex tube and the mixture is heated for 100 hours at 180° C. After opening the tube, it is found that only 0.3% of the original R-124 has reacted.

EXAMPLE IX

The procedure of Example VIII is repeated with the R-124 replaced by five millimoles of R-133a. Analysis of the residual mixture shows that the degree of decomposition of R-133a does not exceed 0.6%.

EXAMPLE X

The procedure of Example VIII is repeated with five millimoles of R-114. The amount of R-114 decomposed does not exceed 1%.

What is claimed is:

1. A composition for use in absorption heating and cooling equipment, said composition comprising a chlorofluoroethane with a boiling point of from −40° to +50° C. and at least one trifluorochloroethylene solvent having a boiling point higher than 100° C. and the general formula:

$$C_mCl_{2m+1}-(CF_2-CFCl)_n-X \qquad (I)$$

where m is zero or one, n is an integer from one to four and at least equal to two when m is zero, and X is hydrogen or chlorine, X being hydrogen only when m is one.

2. A composition according to claim 1 wherein the solvent is a chlorofluorinated oil having the formula:

$$Cl-(CF_2-CFCl)_n-Cl$$

and an average molecular weight of about 500.

3. A composition according to claim 1 wherein the solvent is 1,1,1,3,3-pentachloro-2,2,3-trifluoropropane, 1,1,1,3,5,5-hexachloro-2,2,3,4,4,5-hexafluoropentane, or 1,1,1,3,5-pentachloro-2,2,3,4,4,5-hexafluoropentane.

4. A composition according to claim 1 wherein the chlorofluoroethane has a boiling point of from −20° to +20° C.

5. A composition according to claim 4 wherein the chlorofluoroethane is 1-chloro-1,2,2,2-tetrafluoroethane, 1-chloro-2,2,2-trifluoroethane, or 1,2-dichloro-1,1,2,2-tetrafluoroethane.

* * * * *